(12) United States Patent
Lai (10) Patent No.: US 7,445,511 B1
(45) Date of Patent: *Nov. 4, 2008

(54) CARD CONNECTOR CAPABLE OF GUIDING SMALL EXPRESSCARD

(75) Inventor: Yaw-Huey Lai, Taipei County (TW)

(73) Assignee: Tai-Sol Electronics, Co., Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/896,959

(22) Filed: Sep. 7, 2007

(30) Foreign Application Priority Data

Jul. 12, 2007 (TW) .............................. 96211355 U (51) Int. Cl.
*H01R 24/00* (2006.01)

(52) U.S. Cl. ...................................................... 439/630

(58) Field of Classification Search .................. 439/630
See application file for complete search history.

(56) References Cited

U.S. PATENT DOCUMENTS 7,234,972 B1 * 6/2007 Lai ............................ 439/630

* cited by examiner

*Primary Examiner*—Tho D. Ta
*Assistant Examiner*—Travis Chambers
(74) *Attorney, Agent, or Firm*—Bacon & Thomas, PLLC (57) ABSTRACT

A card connector composed of a housing, a connection socket, and an inclined guiding edge. The housing includes an opening. The connection socket is mounted to a rear part inside the housing, having a plurality of terminals. The inclined guiding edge is mounted in the housing. The housing further includes a guiding piece formed on a top side thereof. The guiding piece has a front guiding portion extending downward rearward toward one side from the housing for a predetermined length, and a limiting portion extending rearward upward for a predetermined length from the front guiding portion. The limiting portion at a peak thereof is connected with the top side of the housing. The guiding piece is located above the relatively wider portion. Therefore, the card connector is capable of guiding the small card is structurally more simplified.

5 Claims, 10 Drawing Sheets

CARD CONNECTOR CAPABLE OF GUIDING SMALL EXPRESSCARD

BACKGROUND OF THE INVENTION

1. Field of the Invention

The present invention relates generally to card connectors, and more particularly, to a card connector capable of guiding a small card.

2. Description of the Related Art

Among the card connectors, an ExpressCard card connector is provided with an L-shaped internal space for matching large and small ExpressCards, wherein the large ExpressCard is L-shaped and the small one is rectangular.

While a large ExpressCard is inserted, the card connector matches the large ExpressCard in shape, such that where the card is inserted will not be wrong. However, while a small ExpressCard is inserted, the opening of the ExpressCard card connector is larger than that of the small ExpressCard in width, such that the small ExpressCard is subject to no alignment with the correct position. For this reason, the ExpressCard card connector further includes an inclined guiding plate located internally for guiding the small ExpressCard during its insertion to the correct position. During insertion of the large ExpressCard, the inclined guiding plate is located below the relatively wider part of the card, such that the inclined guiding plate does not interfere with the card to avoid failure of insertion of the card.

However, the relatively wider front part of the ExpressCard card connector is open, such that there is though the inclined guiding plate, but while the small ExpressCard is inserted, the user may feel that the front end of the small ExpressCard is guided sideward to have the delusion that the card is inserted off-center.

To solve the above-mentioned problem, the present inventor proposed an invention, which was published as U.S. Pat. No. 7,234,972 and disclosed a guiding piece for guiding the small ExpressCard. Such invention indeed attains the effect of guiding the small ExpressCard during its insertion, but it can be more structurally simplified.

SUMMARY OF THE INVENTION

The primary objective of the present invention is to provide a card connector, which is capable of guiding a small card and of more effective alignment of the card during its insertion than the part art.

The secondary objective of the present invention is to provide a card connector, which is more simplified than the prior art.

The foregoing objectives of the present invention are attained by the card connector composed of a housing, a connection socket, and an inclined guiding edge. The housing includes an opening formed at a front end thereof, a first sidewall formed at one side therein, and a second sidewall and a third sidewall, both of which are located at an opposite side therein to the first sidewall. The first and second sidewalls define a relatively narrower space located therebetween and at a rear part of the housing. The first and third sidewalls define a relatively wider space located therebetween and at a front part of the housing. The connection socket is mounted to a rear part inside the housing, having a plurality of terminals. The inclined guiding edge is mounted in the relatively wider space and located between the second and third sidewalls. The housing further includes a guiding piece formed on a top side thereof. The guiding piece has a front guiding portion extending downward rearward toward the first sidewall from the housing for a predetermined length, and a limiting portion extending rearward upward for a predetermined length from the front guiding portion. The limiting portion at a peak thereof is connected with the top side of the housing and parallel to the second sidewall. The guiding piece is located above the relatively wider portion.

DETAILED DESCRIPTION OF PREFERRED EMBODIMENTS

Referring to FIGS. 1-5, a card connector 10 capable of guiding a small ExpressCard, constructed according to a preferred embodiment of the present invention, is composed of a housing 11, a connection socket 21, and an inclined guiding edge 31.

The housing 11 includes an opening 12 formed at a front end thereof, a first sidewall 13 located at one side therein, a second sidewall 14, and a third sidewall 15. The second and third sidewalls 14 and 15 are located at an opposite side of the housing 11 to the first sidewall 13. The first and second sidewalls 13 and 14 define a relatively narrower space 16 located therebetween and at a rear part of the housing 11. The first and third sidewalls 13 and 15 define a relatively wider space 17 located therebetween and at a front part of the housing 11.

The connection socket 21 is mounted to a rear part inside the housing 11, having a plurality of terminals 22.

The inclined guiding edge 31 is formed on an inclined guiding plate 32 and located between the second and third sidewalls 14 and 15. The inclined guiding plate 32 is located in the relatively wider space 17.

The housing 11 includes an upper shell 18 and a lower shell 19, which are covered on each other. The upper shell 18 has a guiding piece 181 extending outward from a top side thereof. The guiding piece 181 has a front guiding portion 182 extending downward rearward toward the first sidewall 13 from the housing 11 for a predetermined length, an intermediate portion 183 formed at a distal end of the front guiding portion 182, and a limiting portion 184 extending rearward upward from the intermediate portion 183 for a predetermined length. A peak of the limiting portion 184 is connected with a top side of the housing 11. The intermediate portion 183 is curved in this embodiment. The guiding piece 181 is located above the relatively wider space 17. The limiting portion 184 is parallel to the second sidewall 14.

Figure 6:
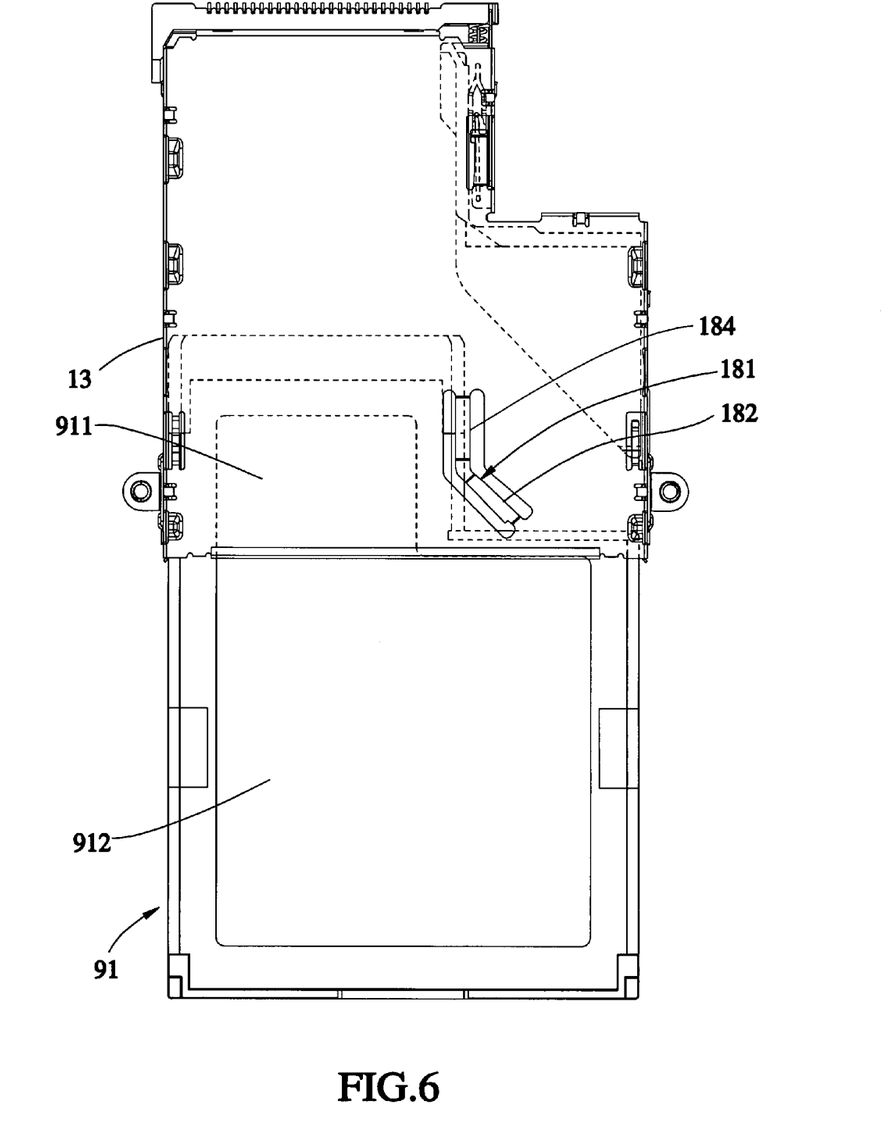
FIG. 6 is a schematic view of the preferred embodiment of the present invention at work, illustrating that the large ExpressCard is being inserted.

Referring to FIG. 6, during insertion of a large Express-Card 91 into the card connector 10 of the present invention, a relatively narrower portion 911 of the large ExpressCard 91 is located between the guiding piece 181 and the first sidewall 13 to be guided, such that a front edge of a relatively wider portion 912 of the large ExpressCard 91 first contacts a bottom side of the front guiding portion 182, while passing through the guiding piece 181, and then raises the guiding piece 181 to be inserted to the rearmost end of the card connector 10 for complete insertion of the card 91. During withdrawal of the card 91, a rear end of the limiting portion 184 is the highest point on the guiding piece 181, such that the front edge of the relatively wider portion 812 of the card 91 contacts a bottom side of the limiting portion 184, raises it a little bit, and then disengage it. Because the guiding piece 181 can be well raised aside during insertion and withdrawal of the card 91, neither deformation nor damage will happen to the guiding piece 181.

Figure 7:
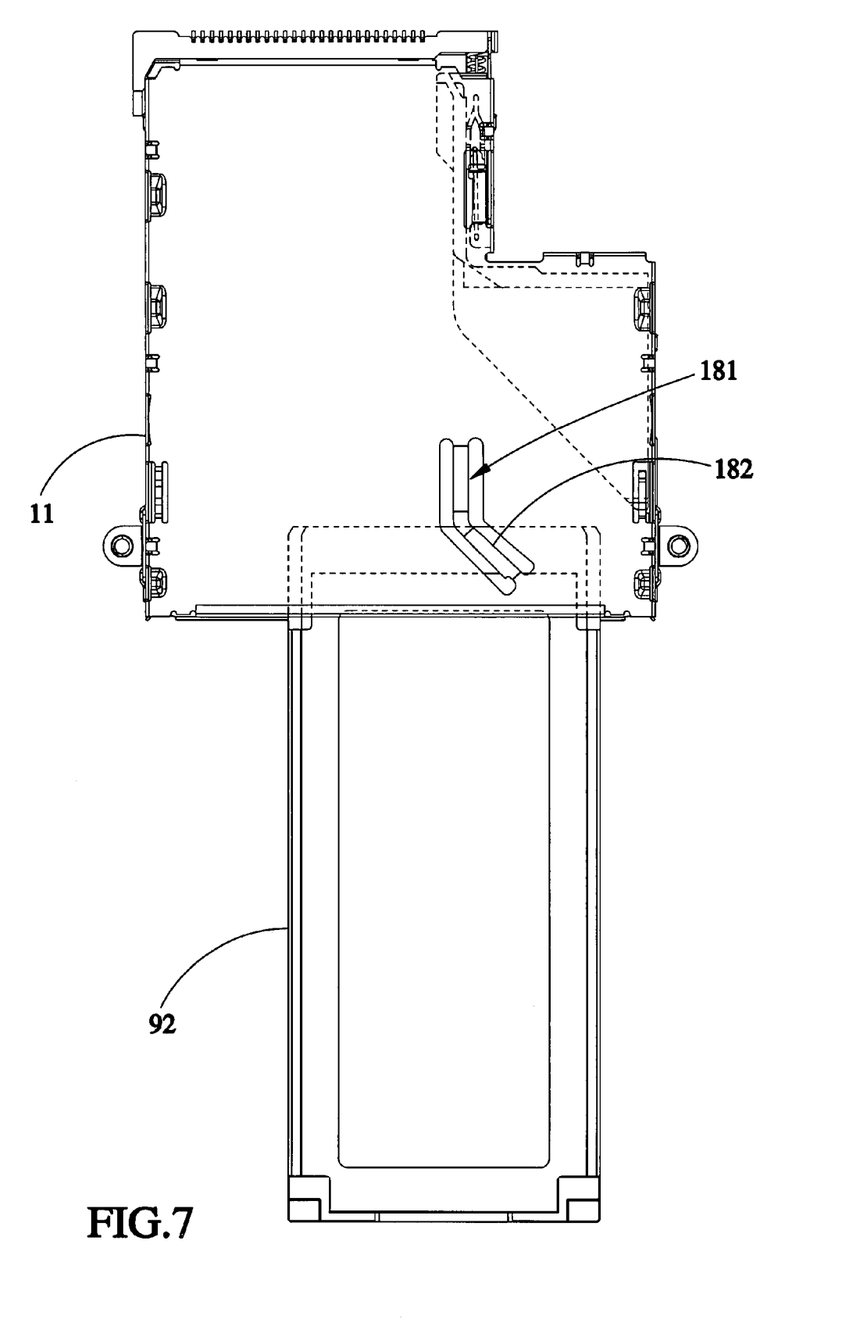
FIG. 7 is another schematic view of the preferred embodiment of the present invention at work, illustrating that the small ExpressCard is initially inserted.
Figure 8:
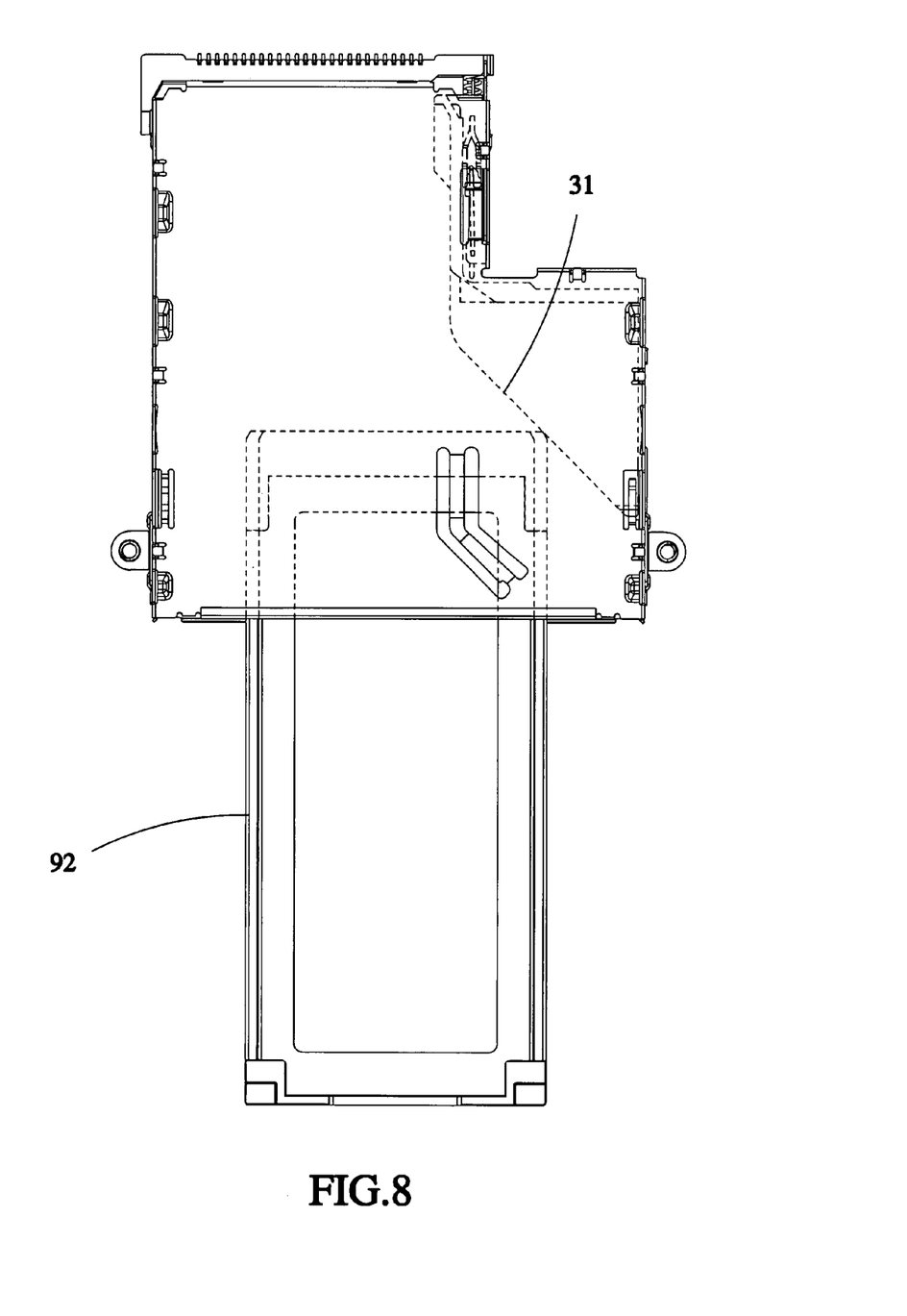
FIG. 8 is another schematic view of the preferred embodiment of the present invention at work, illustrating that the front edge of the small ExpressCard acts against the inclined guiding edge.
Figure 9:
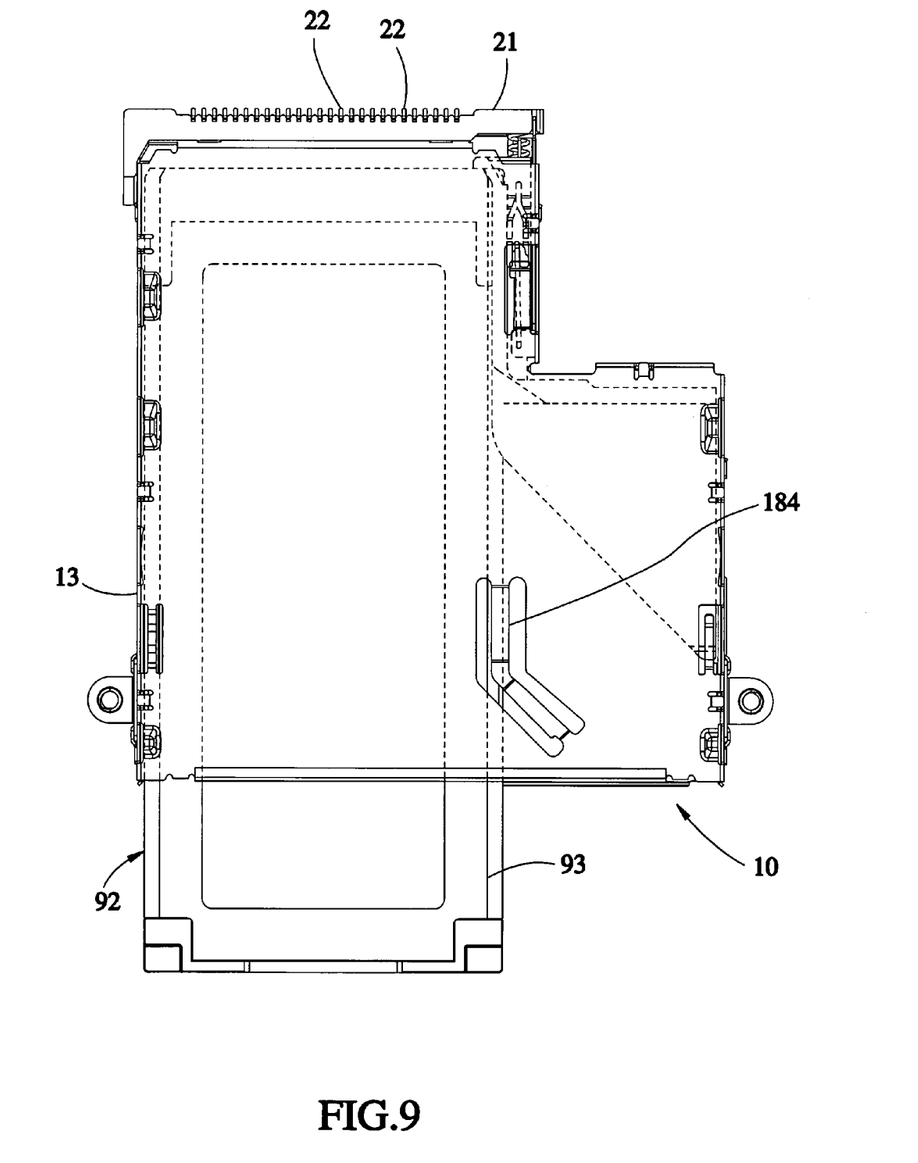
FIG. 9 is another schematic view of the preferred embodiment of the present invention at work, illustrating that the small ExpressCard is fully inserted.
Figure 10:
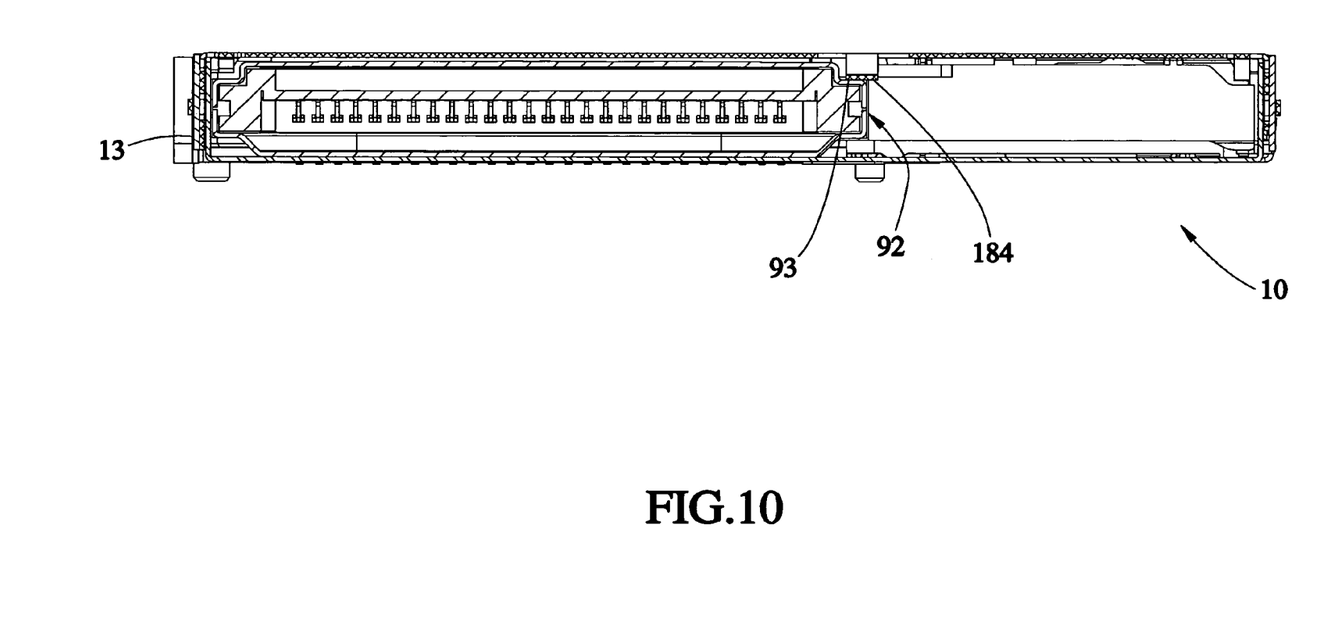
FIG. 10 is a sectional view of FIG. 9, illustrating that the guiding piece acts against the stepped portion of the small ExpressCard.

Referring to FIG. 7, during insertion of the small ExpressCard 92 into the housing 11 without leaning left, a front edge of the card 92 first acts against the bottom side of the front guiding portion 182, and then the card 92 raises the front guiding portion 182 and continues to enter further because the front guiding portion 182 extends sideward (downward rearward). Referring to FIG. 8, when the front edge of the small ExpressCard 92 contacts against the inclined guiding piece 31, the card 92 is acted by the inclined guiding piece 31 to lean left. Referring to FIGS. 9 and 10, while the small card 92 leans left, the limiting portion 184 acts against a stepped portion 93 formed at a top right side of the small card 92 and then the small 92 is held and guided by the limiting portion 184 and the first sidewall 13 to straight enter or move backward, and the small card 92 can be inserted further to the rearmost end of the card connector 10 for complete insertion of the card 92. In the meantime, contact pins (not shown) of the small card 92 are electrically connected with the terminals 22 of the connection socket 21 for complete connection.

Figure 1:
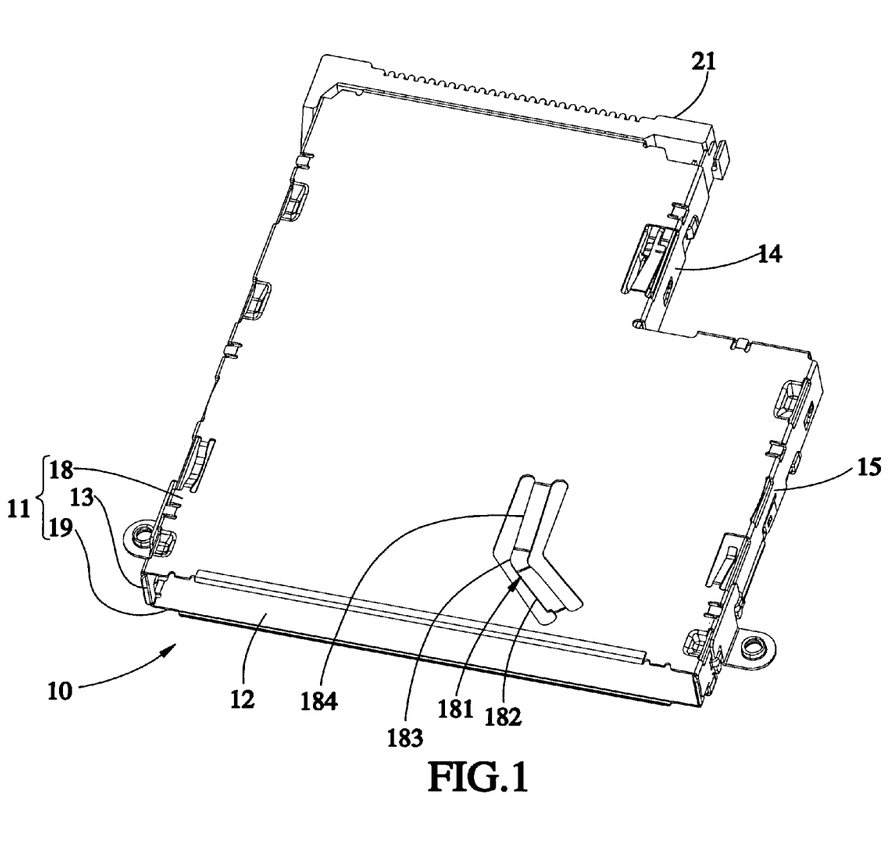
FIG. 1 is a perspective view of a preferred embodiment of the present invention, showing the top side of the card connector.
Figure 2:
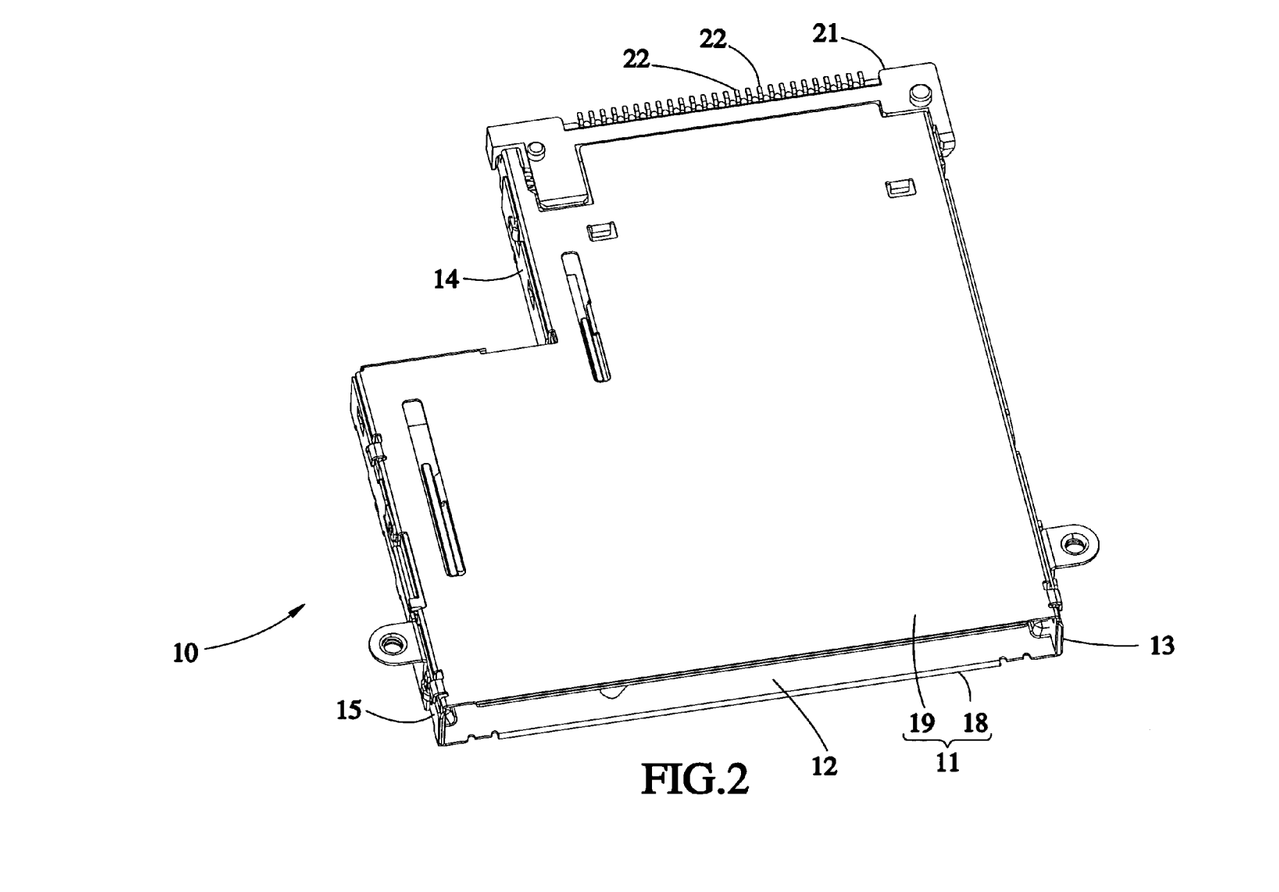
FIG. 2 is another perspective view of the preferred embodiment of the present invention, showing the bottom side of the card connector.
Figure 3:
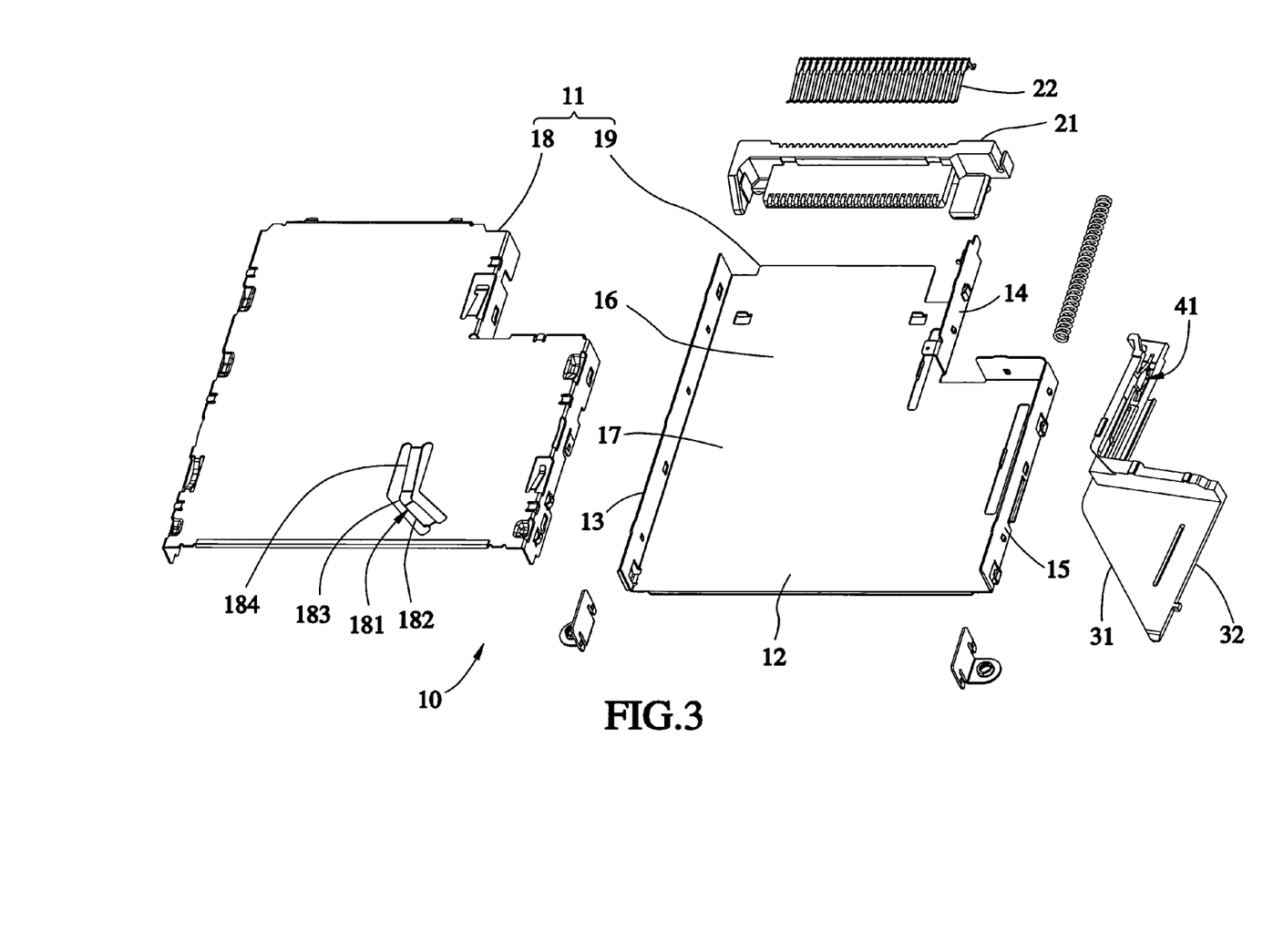
FIG. 3 is an exploded view of the preferred embodiment of the present invention.
Figure 4:
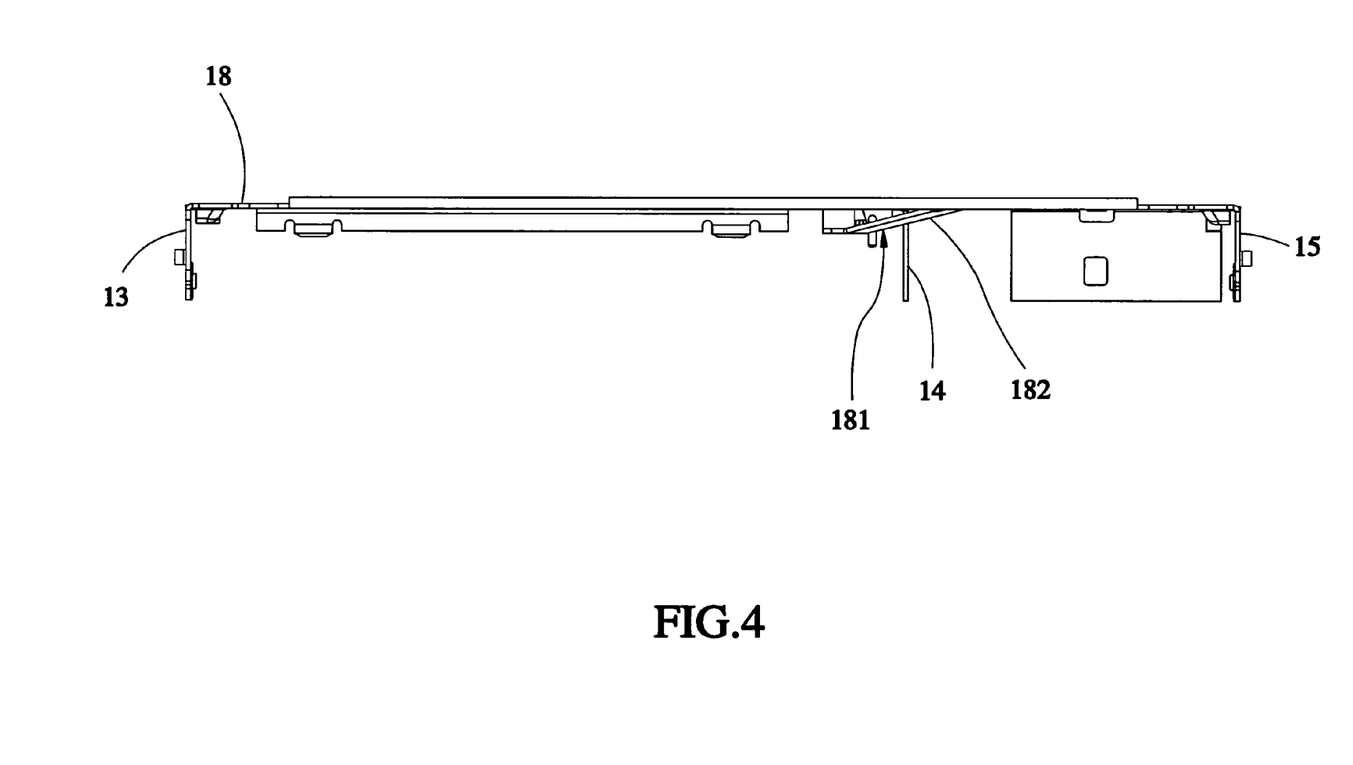
FIG. 4 is a front view of a part of the preferred embodiment of the present invention, showing that the guiding piece is located on the upper shell.
Figure 5:
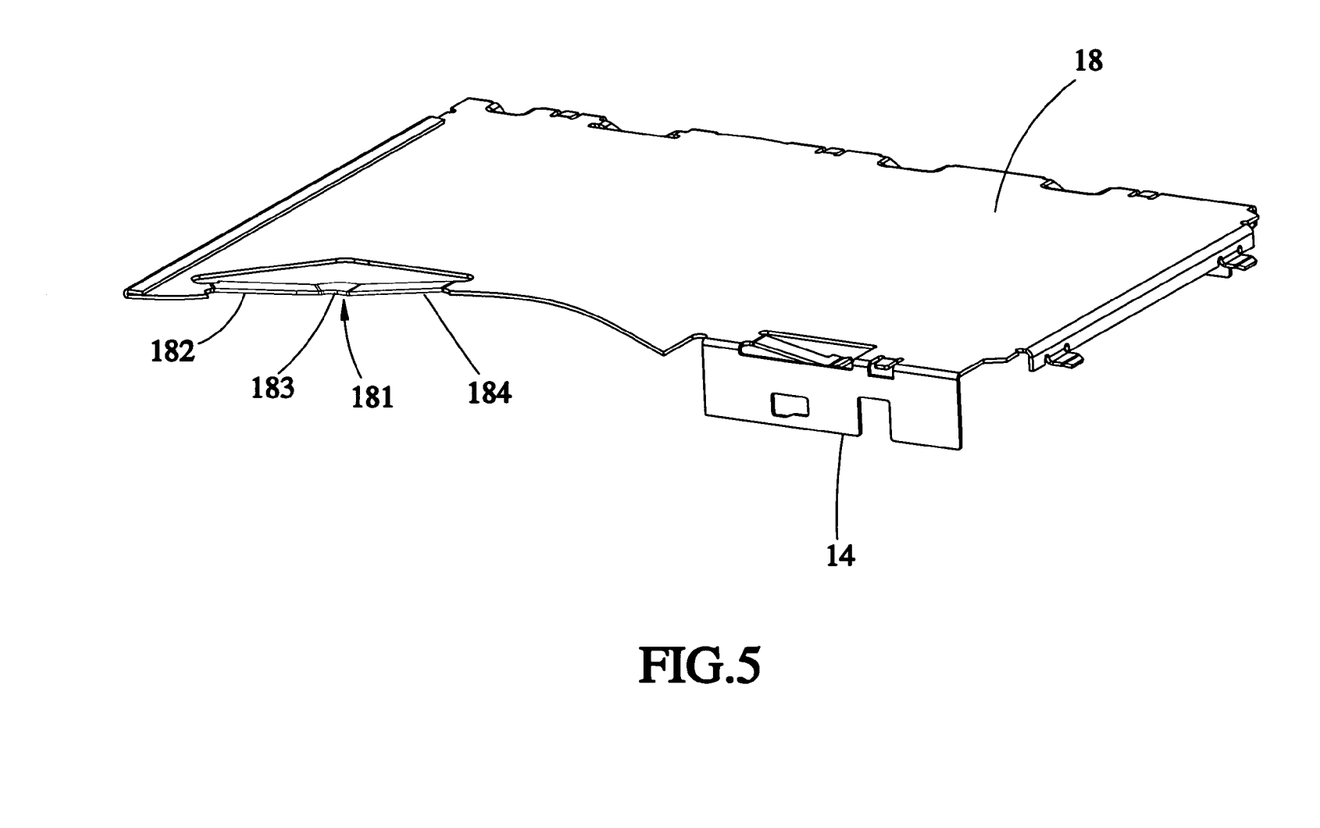
FIG. 5 is a sectional view of a part of the preferred embodiment of the present invention.

When the small card 92 is withdrawn, the card 92 can be directly pulled out or ejected by a conventional ejecting mechanism, such as an ejecting mechanism 41 shown in FIG. 3. Because the ejecting mechanism belongs to the prior art, no detailed description of the same is necessary. During ejection of the small card 92, because a front top side of the card 92 may be unsmooth, the peak of the limiting portion 184 can be raised to allow the card 92 to pass through the limiting portion 184 and then fully be withdrawn, likewise causing no damage to the guiding piece 181.

In addition, if the small card 92 is inserted into the card connector 10 by leaning left, the small card 92 will be initially held and guided by the limiting portion 184 and the first sidewall 13 to move straightforwardly till be full inserted, as shown in FIG. 9.

The inclined guiding edge 31 can be other alternative equivalents. For example, the inclined guiding edge 31 can be a rib protruding toward the relatively wider space from the housing 11, having the same guiding effect. In other words, the inclined guiding edge 31 of the present invention is not limited to being formed on the inclined guiding plate in shape. The rib 31 is structurally simple, so no detailed description is necessary.

In conclusion, the guiding piece of the present invention does not result in unsmooth insertion or withdrawal of the large or small ExpressCard and guides smooth aligned insertion of the small card. Further, the guiding piece of the present invention is structurally simpler than the prior art to make it easier for production thereof.

Although the present invention has been described with respect to a specific preferred embodiment thereof, it is no way limited to the details of the illustrated structures but changes and modifications may be made within the scope of the appended claims.

What is claimed is:

1. A card connector capable of guiding a small ExpressCard card, comprising:
a housing having an opening formed at a front end thereof, a first sidewall formed at a side in said housing, and a second sidewall and a third sidewall, both of which are formed at an opposite side in said housing to said first sidewall, said first and second sidewalls defining a relatively narrower space located therebetween and at a rear part of said housing, said first and third sidewalls defining a relatively wider space located therebetween and at a front part of said housing;
a connection socket mounted to a rear part inside said housing and having a plurality of terminals; and
an inclined edge mounted in said relatively wider space and located between said second and third sidewalls;
wherein said housing has a guiding piece formed at a top side thereof, said guiding piece having a front guiding portion and a limiting portion, said front guiding portion extending downward rearward toward said first sidewall for a predetermined length, said limiting portion extending upward rearward for a predetermined length, said limiting portion having a peak connected with a top side of said housing, said guiding piece being located above said relatively wider space, said limiting portion being parallel to said second sidewall.

2. The card connector as defined in claim 1, wherein said guiding piece is formed with said housing in one piece.

3. The card connector as defined in claim 2, wherein said housing comprises an upper shell and a lower shell, said upper and lower shells being covered on each other; said guiding piece is formed with said upper shell in one piece.

4. The card connector as defined in claim 3, wherein said guiding piece further comprises a curved intermediate portion between said front guiding portion and said limiting portion.

5. The card connector as defined in claim 3, wherein said inclined guiding edge is formed on an inclined guiding plate; said inclined guiding plate is located in said relatively wider space.

* * * * *